Aug. 19, 1969    G. F. PLAMPER    3,461,654
MECHANISM FOR RAISING AND LOWERING CUTTER UNIT AND FOR
CONCURRENTLY CONTROLLING OPERATION OF THE CUTTER UNIT
Filed March 15, 1967    5 Sheets-Sheet 1

INVENTOR.
GÜNTER F. PLAMPER
BY
ATTORNEYS.

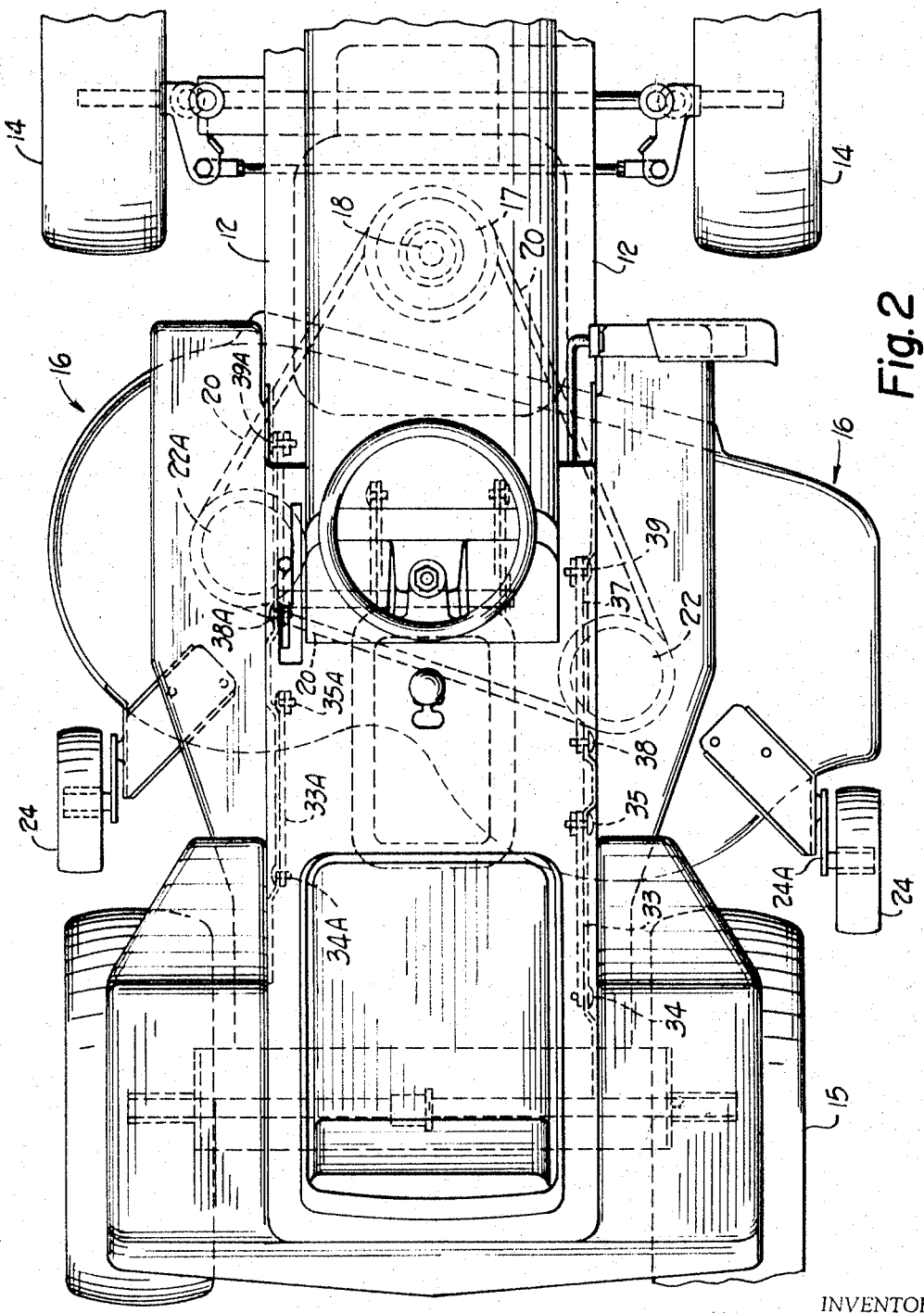

INVENTOR.
GÜNTER F. PLAMPER

INVENTOR.
GÜNTER F. PLAMPER

ATTORNEYS.

Aug. 19, 1969  G. F. PLAMPER  3,461,654
MECHANISM FOR RAISING AND LOWERING CUTTER UNIT AND FOR
CONCURRENTLY CONTROLLING OPERATION OF THE CUTTER UNIT
Filed March 15, 1967

INVENTOR.
GÜNTER F. PLAMPER
ATTORNEYS.

3,461,654
MECHANISM FOR RAISING AND LOWERING
CUTTER UNIT AND FOR CONCURRENTLY
CONTROLLING OPERATION OF THE CUTTER
UNIT
Günter F. Plamper, Cleveland, Ohio, assignor to The
M. T. & D. Company, a corporation of Ohio
Filed Mar. 15, 1967, Ser. No. 623,320
Int. Cl. A01d 35/26
U.S. Cl. 56—25.4                    14 Claims

ABSTRACT OF THE DISCLOSURE

Mechanism for a tractor-carried cutter unit having a blade-rotating pulley connected by a belt with a motor-driven pulley carried by the tractor, the axes of the pulleys being spaced apart and the belt being reeved about them for rotation of the blade-rotating pulley which in turn rotates a blade in a generally horizontal plane, the mechanism including link means in parallelogram form for suspending the cutter unit from the tractor in a plane generally parallel to the tractor frame, lever means carried by the tractor for raising and lowering the cutter unit to desired elevation relative to the tractor frame, biasing means urging the cutter unit in a first direction to maintain tension on the belt reeved about said pulleys, the lever means including means for moving the cutter unit in an opposite direction when raised to elevated position against the urging of the biasing means to loosen tension on the belt at such elevated position and thus to then discontinue rotation of the blade-rotating pulley, and lost-motion means to permit the cutter unit to rise in response to change in ground elevation relative to the tractor independently of movement of the lever means, the mechanism providing safety and more precise and convenient control of the cutter unit for meeting operating conditions.

---

In the operation of rotary type mowers carried by a tractor it is often desired to raise and lower the cutting unit relative to the tractor frame so as to accommodate for different desired cutting lengths of the grass. It is also desired to have the cutting unit ride the ground level to some degree so as to prevent scalping or skinning of the turf. In such mowers it is sometimes desired to raise the cutting unit up out of normal cutting position such as when moving from one area to another and when cutting is not desired. During such movement away from cutting areas it is desired to have the rotating cutting blade or blades stop rotating and not be driven for obvious reasons of safety. It is sometimes necessary to have separate clutching and declutching mechanisms for the cutting blade which needs to be operated as well as the raising and lowering mechanism.

It is an object of my invention to provide means for automatically declutching the drive to the blades when the cutting unit carried by such a tractor is raised to non-elevated and noncutting position.

Another object is the provision for eliminating the need for a separate declutching and clutching mechanism and to depend for such clutching and declutching action on the raising and lowering of the cutting unit.

Another object is to provide for increased safety in the operation of a mower, ease and facility in the operation of the mower and particularly in the positioning of the cutting unit and for providing economy and efficiency in the operation of such devices.

Other objects and a fuller understanding of this invention may be had by referring to the following description and claims, taken in conjunction with the accompanying drawings, in which:

FIGURE 2 is a top plan view of a tractor and cutting unit embodying my invention;

Figure 1:
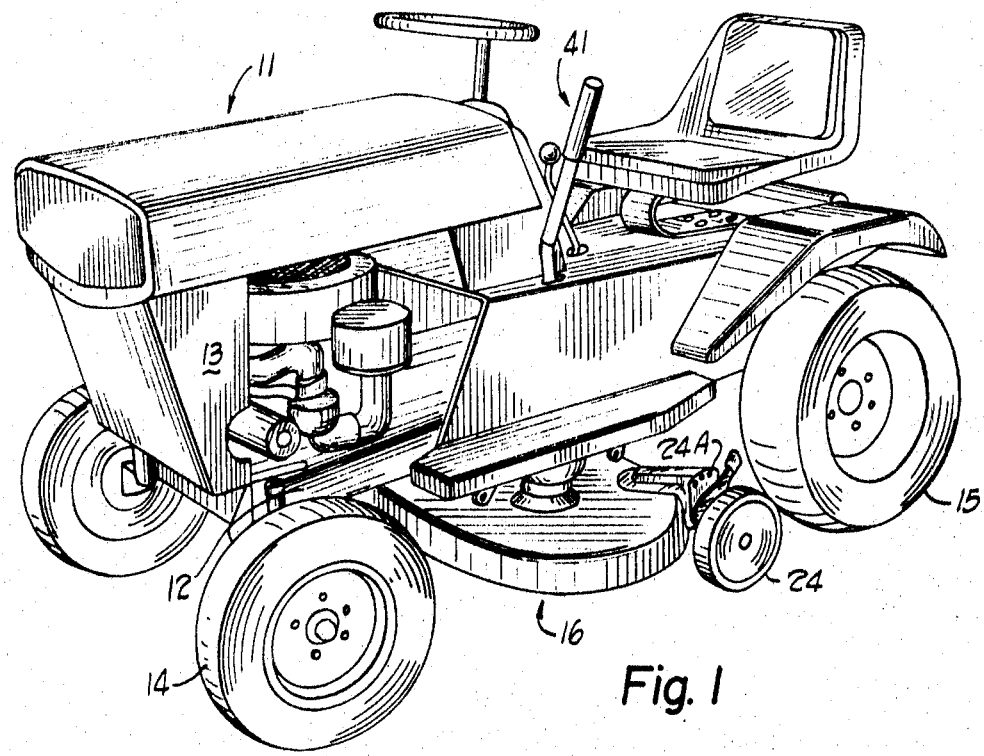
FIGURE 1 is a perspective view of a tractor embodying a preferred form of my invention.

The tractor to which my invention is applied is of the usual type and is denoted in the drawings by the reference character 11. It has a rectangular frame 12 carrying an internal combustion engine or motor 13. Steering front wheels 14 are mounted in the usual way at the forward end of the frame and rear driving wheels 15 are mounted in the usual manner at the rear of the frame.

Disposed below the frame 12 and intermediate the front and rear wheels is a cutting unit denoted generally by the reference character 16. Extending downwardly in a vertical plane from the motor 13 is a motor driven shaft 18 and splined or otherwise non-rotatably secured to the shaft 18 is a pulley 19 around which is reeved a belt which drives the tractor wheels for the propulsion of the tractor. This latter drive of the tractor from the pulley 19 being no part of this invention is not shown.

Splined to or otherwise nonrotatably secured to the lower end of the shaft 18 is another pulley 17 which is used for driving the cutter unit 16. Reeved around this lower pulley 17 is an endless belt 20. This belt 20 when in its uppermost position is denoted by the reference character 20A and in its lowermost position is denoted by the reference character 20B, in the illustration of FIGURE 4.

My invention is applicable to cutting units having one or more rotating cutting blades. In the particular embodiment illustrated there are two cutting blades positioned at opposite sides of the tractor, one being somewhat in advance of the other so as to avoid interference as is usual in such multiple blade cutting units. Journalled on the housing of the cutting unit 16 directly above each cutting blade 21 and disposed on a vertical axis is a shaft 23. Each shaft 23 rotates in a bearing assembly carried in the usual manner by the upper wall of the cutting unit 16. A blade 21 is secured to the lower end of each shaft 23 so as to revolve as the shaft 23 rotates on its axis. Cutting blade 21 of course cuts grass in its path protruding upwardly from the ground below the tractor.

Splined or otherwise non-rotatably secured to the upper end of each shaft 23 is a blade rotating pulley 22. The belt 20 reeved around the pulley 17 is also reeved around the two blade rotating pulleys 22 and 22A as seen in broken lines in FIGURE 2. Thus rotation of the pulley 17 by the motor simultaneously causes rotation of the pulleys 22 and 22A and the respective shafts and blades secured to and rotatable thereby.

Figure 4:
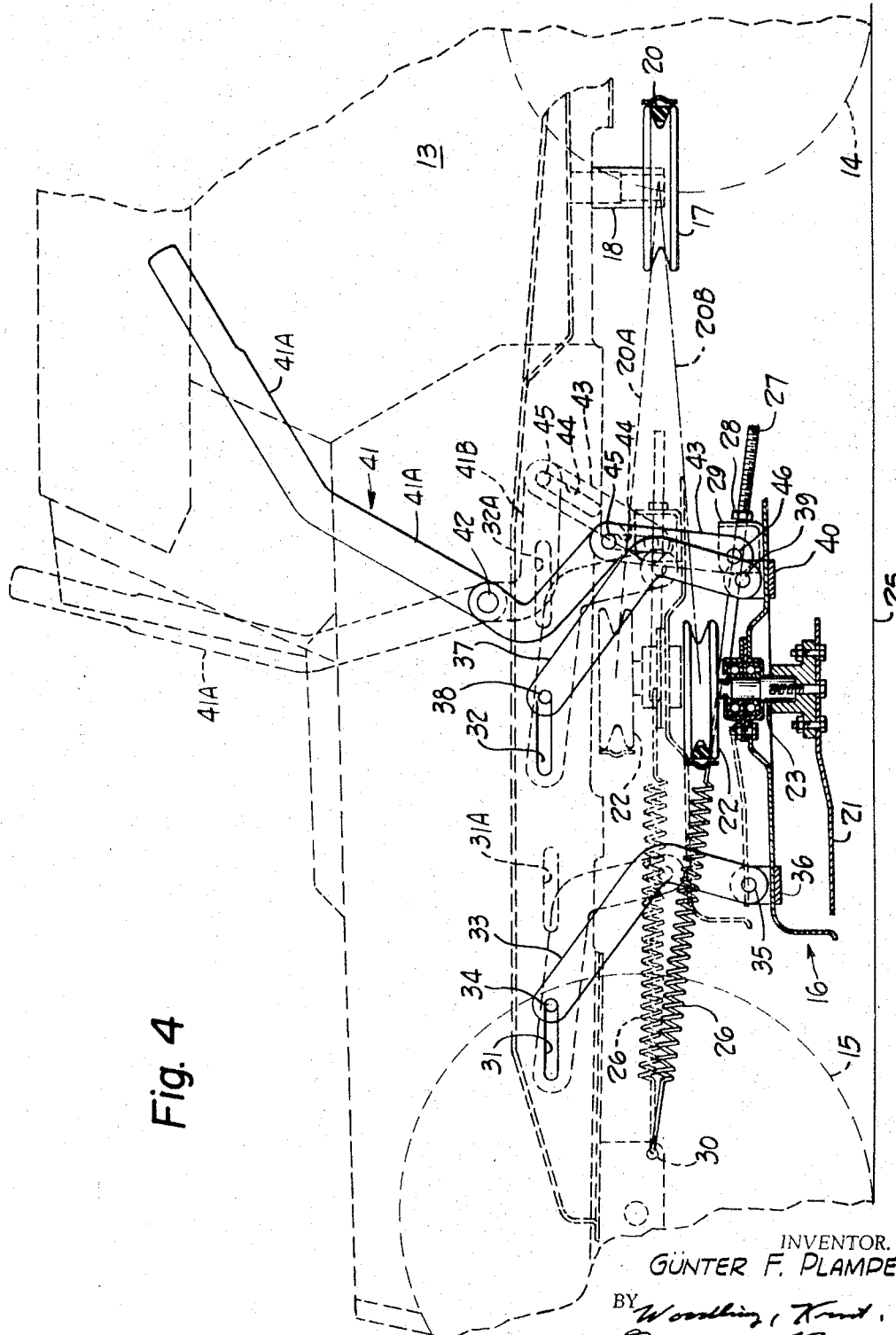
FIGURE 4 is an enlarged view partially in section and partially in phantom illustrating the details of the mounting of the cutting unit to the tractor.
Figure 6:
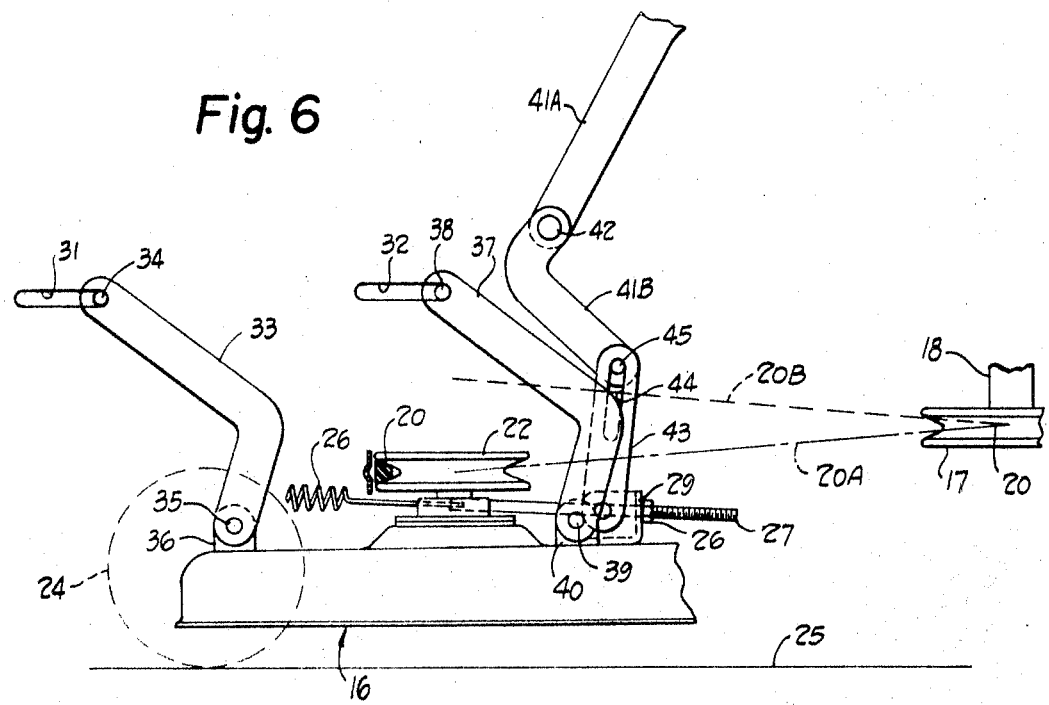
FIGURE 6 is an enlarged view of a portion of the cutting unit and mounting means and showing the cutting unit in lowered position relative to the tractor frame.
Figure 7:
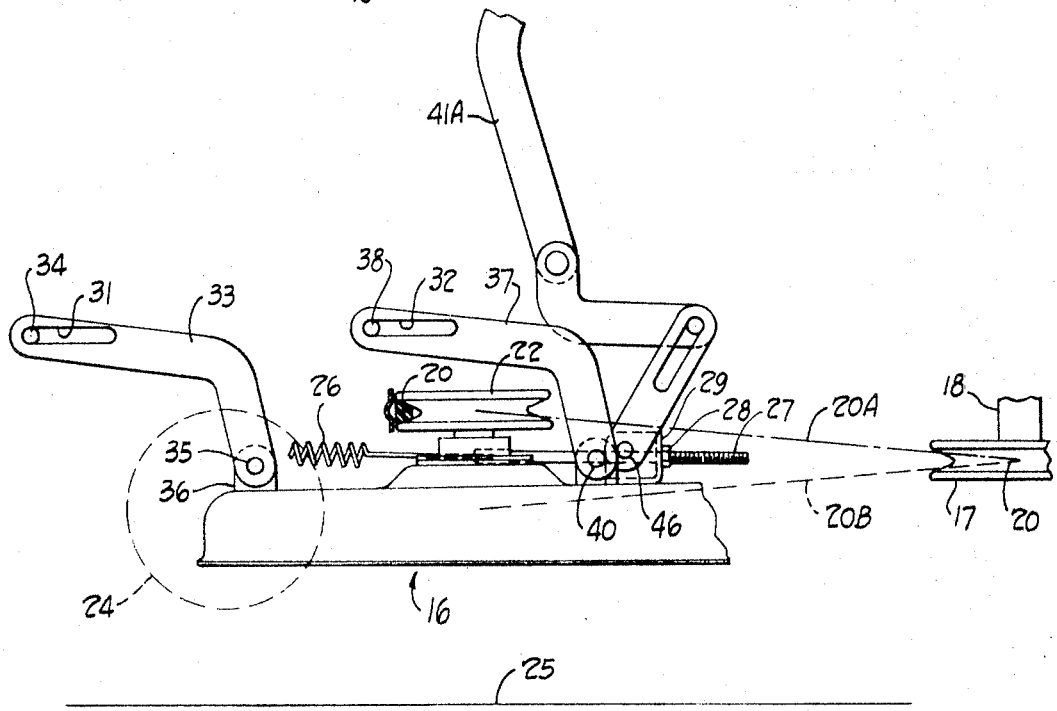
FIGURE 7 is a view similar to that of FIGURE 6 but showing the cutting unit in its uppermost or maximum elevated position.

To prevent the cutting unit from getting too close to the ground there is mounted toward the rear portion of the cutting unit 16 a pair of ground engaging wheels 24 which are journalled on adjuastble brackets 24A which in turn are mounted on the housing of the cutting unit 16. When in cutting operation the wheels 24 trail along and ride upon the ground and determine the lowermost position to which the cutting unit may move. Also as the wheels 24 meet unevenness or irregularities in the ground surface, such as a slight mound, the cutting unit is raised by the wheels 24 relative to the frame of the tractor. In FIGURES 4, 6 and 7, the normal ground level is indicated by the line marked with the reference character 25. There is a long coil spring 26 disposed below the tractor frame intermediate the sides thereof which has one end anchored at 30 to the tractor frame. The other end of the coil spring 26 is secured to a rod 27, which rod 27 has its forward end anchored to a bracket 29 welded or otherwise secured to the top of the housing of the cutter unit 16 near the forward portion thereof. The forward end of the rod 27 is threaded and loosely extends through an opening in the brackets 29. A nut 28 threaded on the forward end of the rod 27 provides an abutment or limit against withdrawal of the rod 27 rearwardly through the opening in the bracket 29 and thus provides for anchoring the rod 27 to the bracket 29. The resilient bias of the spring 26 is such as to maintain a resilient rearward pull on the cutter unit 16 which urges it at all times toward the rear of the tractor and in a direction away from the cutter driving pulley 17 at the forward end of the tractor. The tension of the spring 26 may be adjusted by changing the position of the nut 28 on the rod 27. This resilient urging or bias of the spring 26 thus tends to maintain the driving belt 20 in a good driving connection with the pulley 17 and the two blade rotating pulleys 22 and 22A. This driving tension on the belt 20 is maintained during changes in elevation of the cutter unit 16 as it is moved upwardly and downwardly relative to the tractor frame.

There is provided in the side members of the frame 12 elongated slots which on one side of the tractor are designated as slots 31 and 31A and on the other side of the tractor are designated as slots 32 and 32A. As seen in the drawings the slots 31 and 31A are spaced apart longitudinally of the tractor and this pair of slots is disposed more toward the rear of the tractor than are the slots 32 and 32A on the other side of the tractor, which slots 32 and 32A are similarly spaced apart as shown. In other words, the pair of slots on one side of the tractor are offset from the pair of slots on the other side of the tractor. Supporting the cutter unit 16 from the tractor frame are four link members. On the one side of the tractor, on the right side when looking forward on the driver's seat, are link members 33 and 37. On the other side of the tractor, that is on the left when facing forwardly from the driver's seat, are similar link members 33A and 37A which correspond to link members 33 and 37, respectively. The link members are each dog-leg in conformation, that is they have portions disposed at an approximate right angle to each other as illustrated. The upper portion of each dog-leg link member is inclined upwardly and rearwardly from the juncture of the portions and the lower portion of each link member extends downwardly from this juncture toward the cutter unit. The lower ends of the respective link members are pivotally connected to the top wall of the housing of cutter unit 16. On one side of the housing of the cutter unit there is a bracket 36 secured thereto near the rearward portion thereof and another bracket 40 on the same side secured forwardly thereof. These brackets provide support for pivot pins 35 and 39, respectively, which pivot pins in turn are pivotally connected with the lower ends of the link members 33 and 37 respectively. On the other side of the cutter unit there are corresponding brackets 36A and 40A for providing the pivotal connection between the cutter unit and link members 33A and 37A by means of corresponding pivot pins 35A and 39A.

Mounted to the upper ends of the respective link members there are pins which ride in and slide along the length of the elongated slots formed in the frame side members. Pin 34 welded to or otherwise secured to the upper end of link member 33 pivots in and also slides along the slot 31. Similarly the pin 38 secured to the upper end of link member 37 pivots in and slides along the slot 32. On the other side of the tractor pin 34A secured to the upper end of link member 33A pivots in and slides along the slot 31A, and also the pin 38A secured to the upper end of the link member 37A pivots in and slides along the slot 32A. The axes of these pins are of course disposed normal to the longitudinal dimension of the respective link members. The ends of the pins on the opposite sides of the frame side members carry heads, nuts or other means to prevent the pins from being withdrawn from the respective slots.

There is thus provided a parallelogram structure for the suspension of the cutter unit 16 from the tractor frame. The link members tend to keep the cutter unit in a general horizontal plane parallel to the plane of the tractor frame. As the cutter unit is raised or lowered it tends to maintain its parallel relationship to the frame. To accommodate for relative forward and rearward movement of the cutter unit relative to the frame, the respective pins 34, 38, 34A and 38A slide along the slots at the same time that pivotal swinging of the link members may occur. Raising and lowering of the cutter unit by the ground engaging wheels 24 tends to raise the cutter unit 16 in the described parallel relationship because of the parallelogram structure. There is, however, enough play or looseness of the pins in the respective slots provided in the frame that the cutter unit may tilt to some degree when so required to meet unevenness in the ground level relative to the tractor frame, as for example when there is a mound on one side which raises one wheel 24 more than wheel 24 on the other side is raised.

For manually raising and lowering the cutter unit by the operator there is provided a lever member 41 which is pivotally carried by a pivot pin 42 on the frame 12 of the tractor. The operator driving the tractor by swinging the upper end of the lever 41 forwardly and rearwardly manipulates the lever to actuate the same.

It is to be noted that the lever 41 has an upright portion 41A and a lower portion 41B which are disposed substantially at a right angle to each other at a juncture located below the axis of the pivot pin 42. Thus as the upper portion 41A is moved downwardly, as to its position shown in full lines in FIGURE 4, the lower portion 41B has its free end moved both downwardly and rearwardly of the tractor frame. When the lever is in its position shown in broken lines in FIGURE 4, the upper portion 41A is swung rearwardly and the lower portion 41B is swung forwardly and upwardly whereby its free end is moved both upwardly and forwardly relative to the tractor frame.

Figure 5:
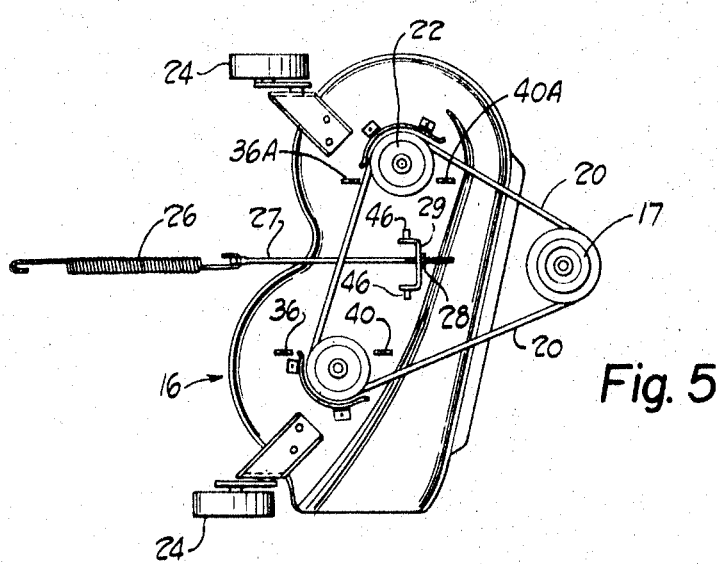
FIGURE 5 is a plan view of the cutting unit disassembled from the tractor.
Figure 3:
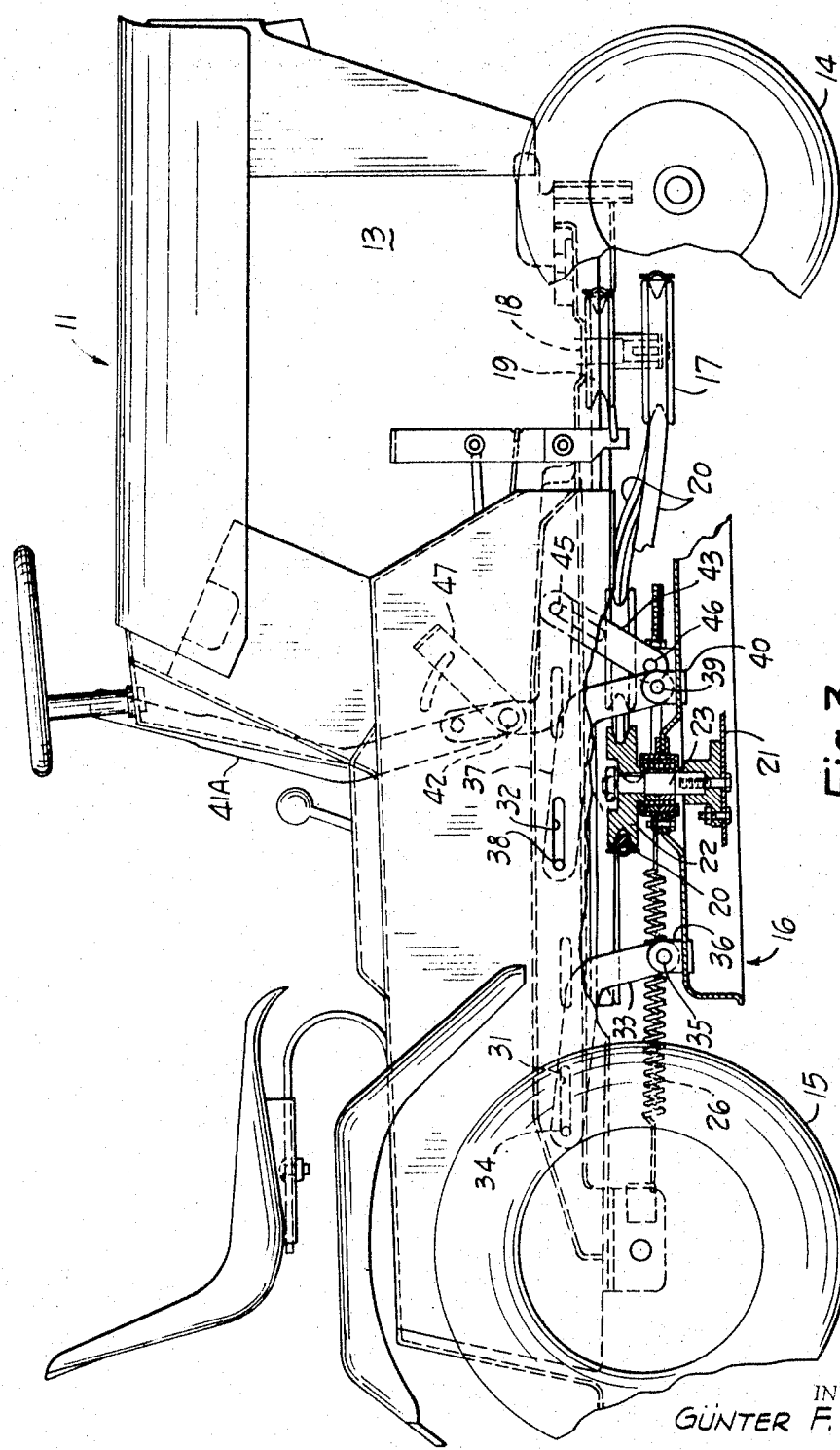
FIGURE 3 is a side view, partially in section, of the tractor and cutting unit embodying my invention.

There is a link 43 connecting the free end of the lower portion 41B of the lever and the cutter unit 16 adjacent its forward portion. As better seen in FIGURE 5, the bracket 29 carries pivot connections 46 disposed on an axis extending laterally of the tractor and the cutter unit 16. The link member 43 is bifurcated and the lower ends of the bifurcated link member 43 are pivotally connected with the pivot connections 46 so as to be thereby pivotally secured to the cutter unit. The free end of the lever portion 41B has a pin 45 extending therethrough to protrude on opposite sides thereof, the axis of the pin 45 being disposed laterally of the tractor. There is provided in the bifurcated portions of link 43 an elongated slot 44 in which the pin 45 is accommodated. Thus the pin 45 may move up and downwardly in slot 44 of the link 43. The length of the slot 44 and the angularity and disposition of the lever portion 41B is such that when it is desired to raise the cutter unit pin 45 reaches its uppermost position in the slot 44 and the swinging of the upper end of the lever 41 causes the link 43 to move upwardly and forwardly and thus to cause the cutter unit 16 to be raised and also moved forwardly. The lever 41 may be held in any desired position by a detent mechanism 47 functioning in the usual manner. It is to be noted that when the cutter unit is raised to its uppermost position and when approaching that uppermost position, the cutter unit has been moved forwardly relative to the frame so far that the resilient bias of the spring 26 is overcome and the tension on the driving belt 20 is loosened. In the region of this uppermost elevation the tension on the belt 20 is so relaxed or loosened that the pulleys 22 and 22A which rotate the cutting blades are no longer driven, in other words, the cutting blades are declutched when the cutter unit 16 is raised to its upper elevation. The disposition and dimension of the parts is such that the declutching action does not occur until the cutter unit is at its uppermost or close to uppermost elevation so that the pulleys 22 and 22A which drive the blades are still driven in most of their positions except of the uppermost or close to the uppermost position. It is preferred for example that the declutching or loosening of the belt 20 does not occur until it is within a few degrees of its uppermost position shown by the line 20A in FIGURE 4. If for example the angle between the lines 20A and 20B illustrated in FIGURE 4 is on the order of ten degrees (10°), then it is preferable that the declutching does not commence until the belt 20 is raised to about a line of on the order of two degrees (2°) relative to the uppermost line 20A. In other words, it is desired to have the belt loosened and not tensioned when the cutter unit is definitely in a raised position for not cutting grass but to permit the blades to be rotated in various elevations of the cutter unit which are below the region or area preferred for declutching in the upper elevations.

As readily seen from those knowing the problems of the manufacture, operation and safe maneuvering of such devices as were illustrated, this invention provides for superior results and for safer operation.

The present disclosure includes that contained in the appended claims as well as that in the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Mechanism for suspending a cutter unit from a tractor frame having a motor-driven pulley carried by the frame, the cutter unit having a blade-rotating pulley carried thereby, the axes of said pulleys being disposed generally vertical, parallel of each other and spaced apart, the axis of the motor-driven pulley being disposed generally forwardly of the frame from the axis of the blade-rotating pulley, a belt reeved about the pulleys for the driving of the blade-rotating pulley by the motor-driven pulley, said mechanism comprising in combination parallel link means interconnecting said frame and cutter unit to permit variable elevation of the cutter unit relative to the frame in planes parallel thereto, lever means pivotally carried by said frame and linked to said cutter unit for varying the elevation of said cutter unit, biasing means interconnecting said frame and cutter unit for varying the axis of said blade-rotating pulley carried by the cutter unit rearwardly of the frame away from the axis of said motor-driven pulley for maintaining driving tension on said belt in varying elevations of the cutter unit, said lever means including first means for raising the elevation of the cutter unit relative to said frame and second means for moving the cutter unit forwardly against the urging of said biasing means upon moving the lever means in one direction and for permitting the cutter unit to descend relative to the frame and permitting the cutter unit to move rearwardly under the urging of said biasing means upon moving the lever means in an opposite direction, the forward movement of the cutter unit to an elevated position moving the axis of the blade-rotating pulley toward the axis of the motor-driven pulley for loosening the driving tension on said belt and discontinuing the rotation of the blade-rotating pulley at such elevated position.

2. Mechanism claimed in claim 1 and including ground-engaging means carried by the cutter unit for raising the cutter unit relative to the frame in response to changes in ground level relative to the frame, and pin-and-slot connections between the cutter unit and frame to permit the cutter unit to be raised relative to the frame by said ground-engaging means independently of movement of said lever means.

3. Mechanism claimed in claim 2 and in which said pin-and-slot connections are included between said frame and said parallel link means.

4. Mechanism claimed in claim 1 and including elevation-responsive means responsive to changes in ground level relative to, and beneath, the frame for raising the cutter unit relative to the frame in response to rises in such ground level, and yieldable connection means included in said link means for accommodating the raising of said cutter unit in response to changes in said ground level independently of the operation of said lever means.

5. Mechanism as claimed in claim 4, and including additional yieldable connection means between said lever means and cutter unit for accommodating the raising of said cutter unit in response to changes in said ground level during the time said lever means remains in a fixed position.

6. Mechanism for suspending a mower cutter unit below the longitudinally extending frame of a motor-driven tractor, the tractor having a motor-driven pulley mounted on a generally vertical motor-driven shaft adjacent the forward portion of the tractor, the cutter unit being disposed under the tractor frame rearwardly of the said motor-driven pulley and movable up and down relative to the tractor frame, said cutter unit having at least one generally vertical blade-rotating shaft journalled thereon and carrying a cutting blade rotatable in a generally horizontal plane, and a blade-rotating pulley secured thereto, and a driving belt reeved about said motor-driven pulley and said blade-rotating pulley for the rotation of said blade by the tractor motor, said mechanism comprising in combination two pairs of link members, one pair on each side, extending between the tractor frame and cutter unit at spaced locations fore and aft of the cutter unit, said link members at their lower ends being pivotally connected by first pivot connections to the cutter unit and at their upper ends being pivotally connected by second pivot connections to said frame, the axes of said pivot connections being parallel and disposed laterally of the tractor frame whereby a parallelogram structure is provided, a spring member interconnecting said frame and said cutter unit to resiliently urge the cutter unit rearwardly of the frame away from the motor-driven pulley to thereby maintain driving tension on the belt between the motor-driven pulley and the blade-rotating pulley, and a lever member mounted on a lever pivot pin carried by said frame, said lever member having a first portion extending upwardly from said lever pivot pin for manipulation by the tractor operator and a second portion extending forwardly at an angle to said first portion at a location below said lever pivot pin carried by the frame, and a fifth link member extending between said second portion of the lever member and the said cutter unit, the said fifth link member at its lower end being pivotally connected by a first pivot connection to said cutter unit and at its upper end being pivotally connected by a second pivot connection to said second portion at a location forwardly of the said lever pivot pin, the movement of said lever member in one direction raising the cutter unit to swing on said pairs of link members upwardly toward the frame and in a forward direction against the resilient urging of said spring member to loosen the driving tension of said belt and to thereby discontinue the rotation of the blade-rotating pulley at elevated position of the cutter unit, the movement of the lever member in an opposite direction permitting the cutter unit to swing on said pairs of link members downwardly away from the frame and in a rearward direction under the resilient urging of the spring member to maintain the driving tension of said belt and to thereby cause rotation of the blade-rotating pulley at lowered position of the cutter unit.

7. Mechanism as claimed in claim 6 and including ground-engaging means carried by the cutter unit for causing the cutter unit to be swung upwardly on said pairs of link members and raised upwardly relative to the frame by raises in the elevation in the ground below said frame as the tractor moves along the ground, and in which said second pivot connections between the frame and the upper ends of the respective link members of said pairs of link members are slidable pivotal connections, and the second pivot connection between the said second portion of the lever member and the upper end of the fifth link member is a slidable pivot connection, said slidable pivotal connections permitting upward movement of the cutter unit in response to raises in the ground level below the tractor frame without movement of the lever member.

8. Mechanism as claimed in claim 6 and in which the cutter unit includes at least two blade-rotating shafts and associated blade-rotating pulleys having their vertical axes spaced apart laterally of the tractor frame and their axes at different distances longitudinally of the frame from the axis of motor-driven pulley whereby the blades driven by the respective blade-rotating pulleys are offset to avoid interference, the said belt being reeved about both said blade-rotating pulleys and the motor-driven pulley, and in which one pair of said link members on one side of the frame is offset from the pair of said link members on the other side of the frame to accommodate for the varying longitudinal spacing of said blade-rotating pulleys from the motor-driven pulleys.

9. Mechanism as claimed in claim 6 and in which the link members of said pairs of link members are dog-leg in form having an upper portion inclined forwardly and a lower portion inclined downwardly at an angle therefrom, and in which each of the forward ends of said upper portions are connected by a slot and pin connection to the frame to provide both pivotal and lost-motion connections between the link members and the frame.

10. Mechanism as claimed in claim 6 and in which the frame is provided with four longitudinally extending parallel elongated slots for accommodating the pivot connections between link members and frames and permitting lost motion therebetween, and in which the second portion of the lever member is provided with an elongated slot for accommodating the pivot connection between said fifth link member and the said second portion and permitting lost motion therebetween, whereby the cutter unit pivotally connected with said pairs of link members and said fifth link member may raise in elevation relative to the frame independently of the position of the lever member.

11. Mechanism for changing the elevation of a mower cutter unit relative to a tractor frame carrying the cutter unit, the tractor having a motor-driven pulley and the cutter unit having a blade-rotating pulley having an axis spaced from the axis of the motor-driven pulley, and belt means reeved about said pulleys for the driving of the blade-rotating pulley by the motor-driven pulley upon maintenance of driving tension on said belt means, said mechanism comprising in combination parallel link means connecting said frame and cutter unit for suspending the cutter unit from the frame and maintaining the cutter unit generally aligned with the frame and in a plane generally parallel to the plane of said frame, biasing means interconnecting the frame and cutter unit for biasing the blade-rotating pulley in a direction away from the axis of the motor-driven pulley to maintain driving tension on said belt means, lever means pivotally carried by the frame, said lever means including a link member connected to said cutter unit, said lever means having structure to provide, upon manipulation of the lever means in one direction, an upward component of force to raise the cutter unit toward said frame to an elevated position and also another component of force to move the cutter unit against the biasing action of said biasing means toward the axis of said motor-driven pulley to loosen the driving tension of said belt means at said elevated position, and upon manipulation of the lever means in an opposite direction, a downward component of force to permit the cutter unit to lower away from said frame to a lowered position and also another component of force to permit the cutter unit under the biasing action of said biasing means to move away from the axis of said motor-driven pulley to maintain the driving tension of said belt means at said lowered position, the arrangement providing for the discontinuance of the driving of the blade-rotating pulley by elevation and forward movement of the cutter unit sufficiently to loosen the driving tension of said belt means.

12. Mechanism as claimed in claim 11 and including ground-engaging means carried by the cutter unit for raising the cutter unit toward the frame in response to increases in the elevation of the ground below the frame relative to the plane of the frame, and first lost-motion means included in said parallel link means and second lost-motion means included in said lever means to permit the cutter unit to be raised by the said ground-engaging means independently of the manipulation of said lever means.

13. Mechanism as claimed in claim 12 wherein said first lost-motion means comprises elongated slots in said frame extending longitudinally thereof and pins in said slots, respectively, carried by said link means and arranged to move in said slots longitudinally of the frame in response to changes in the elevation of the cutter unit relative to said frame by said ground-engaging means, and said second lost-motion means comprises a pin and elongated slot connection in said lever means, the pin being arranged to move in said slot in response to changes in the elevation of the cutter unit relative to said frame by said ground-engaging means.

14. Mechanism as claimed in claim 11 and including a plurality of blade-rotating pulleys having their respective axes spaced from each other and from the axis of said motor-driven pulley, said belt means being operatively reeved about said plurality of blade-rotating pulleys and said motor-driven pulley, and including detent means for holding said lever means at selected positions and the cutter unit at the selected elevation determined by the lever means.

References Cited

UNITED STATES PATENTS

| | | | |
|---|---|---|---|
| 3,169,358 | 2/1965 | Ertsgaard et al. | 56—25.4 |
| 3,234,719 | 2/1966 | Rank | 56—25.4 |
| 3,245,209 | 4/1966 | Marek | 56—25.4 |
| 3,357,165 | 12/1967 | Thon | 56—25.4 |

RUSSELL R. KINSEY, Primary Examiner